United States Patent
Scholz

(10) Patent No.: US 12,331,843 B2
(45) Date of Patent: Jun. 17, 2025

(54) SAFETY DEVICE

(71) Applicant: GEA Tuchenhagen GmbH, Büchen (DE)

(72) Inventor: Gundar Scholz, Schönberg (DE)

(73) Assignee: GEA Tuchenhagen GmbH, Büchen (DE)

( * ) Notice: Subject to any disclaimer, the term of this patent is extended or adjusted under 35 U.S.C. 154(b) by 9 days.

(21) Appl. No.: 18/034,266

(22) PCT Filed: Oct. 26, 2021

(86) PCT No.: PCT/EP2021/079609
§ 371 (c)(1),
(2) Date: Apr. 27, 2023

(87) PCT Pub. No.: WO2022/090189
PCT Pub. Date: May 5, 2022

(65) Prior Publication Data
US 2023/0407987 A1 Dec. 21, 2023

(30) Foreign Application Priority Data
Oct. 27, 2020 (DE) .................... 10 2020 006 587.2

(51) Int. Cl.
| F16K 35/02 | (2006.01) |
| F15B 15/14 | (2006.01) |
| F15B 20/00 | (2006.01) |
| F16K 31/12 | (2006.01) |

(Continued)

(52) U.S. Cl.
CPC ............ F16K 35/02 (2013.01); F15B 15/149 (2013.01); F15B 20/00 (2013.01); F16K 31/12 (2013.01); F16L 55/10 (2013.01); F15B 15/26 (2013.01)

(58) Field of Classification Search
CPC ......... F16K 35/02; F15B 15/149; F15B 20/00
See application file for complete search history.

(56) References Cited

U.S. PATENT DOCUMENTS

| 4,865,077 A | * | 9/1989 | Batchen | ................. F16L 37/33 137/614.04 |
| 5,201,201 A | | 4/1993 | Sylvester et al. | |

(Continued)

FOREIGN PATENT DOCUMENTS

| DE | 24 01 505 A1 | 7/1975 |
| DE | 25 28 757 B2 | 5/1980 |

(Continued)

*Primary Examiner* — Paul J Gray
(74) *Attorney, Agent, or Firm* — Young Basile Hanlon & MacFarlane, P.C.

(57) ABSTRACT

A safety device comprises a main body that extends along a longitudinal axis, a first coupling portion and a second coupling portion, and a first sleeve and a second sleeve. The first and second sleeves are arranged on the main body so as to be movable along the longitudinal axis. The first and second sleeves and the main body are selectively movable into a position in which at least one of the first sleeve or the second sleeve cover the associated first coupling portion and second coupling portion. The covering sleeve can be locked in that position. An arrangement comprising a control head and a drive with the safety device and a method for arranging the drive and the safety device are also described.

16 Claims, 2 Drawing Sheets

(51) Int. Cl.
*F16L 55/10* (2006.01)
*F15B 15/26* (2006.01)

(56) References Cited

U.S. PATENT DOCUMENTS

| | | | |
|---|---|---|---|
| 7,360,976 B2 * | 4/2008 | Bryan | B23Q 1/0018 |
| | | | 409/230 |
| 2012/0000259 A1 | 1/2012 | Gilbert | |
| 2013/0180610 A1 | 7/2013 | McGowan | |
| 2020/0132215 A1 | 4/2020 | Neu | |

FOREIGN PATENT DOCUMENTS

| | | |
|---|---|---|
| DE | 197 25 999 C1 | 11/1998 |
| DE | 20 2008 001 778 U1 | 4/2008 |
| DE | 10 2017 130 208 A1 | 6/2019 |
| EP | 0 477 704 A1 | 4/1992 |
| WO | 2013/109184 A1 | 7/2013 |

* cited by examiner

SAFETY DEVICE

TECHNICAL FIELD

This disclosure relates to a safety device, to an arrangement comprising a drive and a control head, and to a method.

BACKGROUND

Valves that cooperate with a safety device are used in plants for producing food products, beverages, medicines, and fine chemical products, as well as in biotechnology. In these applications, pneumatic drives have become prevalent for changing the actuation state of the valve. The change of the actuation state is often controlled from a central plant control system.

During maintenance of plants of this kind, it is important to bring at least parts thereof into a defined state and to keep them securely in said state. For example, it may be necessary to swap a piece of pipe with a device and to remove said piece of pipe from the system. For it to be possible to remove the piece of pipe, a valve is shut off upstream and downstream thereof. If the piece of pipe has been removed, it must be ensured that the valves remain shut off, as otherwise the plant could become contaminated and/or product could be lost.

This locking and securing of the valve is referred to as "lock-out/tag-out" (LOTO), and the plant enters into a LOTO state.

Various procedures and devices are known in the prior art.

WO 2013/109184 A1 proposes mechanically locking the piston of a pneumatic drive, thus preventing unintended switching.

According to DE 102017130208 A1, a locking element is provided that can be brought into engagement with a locking contour on a valve stem to thus prevent movement of the valve stem.

US 2020/0132215 A1 also proposes bringing a locking element into engagement with a valve rod. This is intended to prevent rotation of the valve rod for operating the shut-off element of the valve.

In this prior art, structural modifications are often made to the valve itself or to the operating device. A safety device is integrated as a mechanical component in the valve or in the associated drive.

SUMMARY

An object of selected embodiments in accordance with the present invention is to provide an improved safety device.

This object is achieved with a safety device, a system incorporating the safety device, and a method for operating the safety device described herein.

Two sleeves are provided on a main body and are movable on the main body. They can be locked in a position in which at least one of them covers the first or second coupling. On account of the locking, the coupling connections are no longer releasable in the position. It can be sufficient to immobilize only the compressed air line and thus interrupt the supply of compressed air. Even if the connection on the control head can still be operated, accidental supply of compressed air is hindered to a sufficient extent. This is helpful in the case of an angular arrangement in which the longitudinal axes of the coupling portions are at an angle to one another. It is safer to block the connection at the control head, because then the compressed air line does not have to be immobilized. However, the safest design is when both coupling portions are immobilized and no longer operable.

The safety device according to the teachings herein can be retrofitted. Structural modifications to the valve that generate costs across a large number of units are not required. If a valve needs to be secured after installation of the valve in the plant, the safety device can be easily retrofitted on the drive or on the control head controlling same. Overall, this is cost-effective. Unintended switching is reliably prevented because the drive or control head or both are cut off from the supply of pressure medium and thus cannot perform any switching at all. Wear, which can occur for example on a blocking element integrated in the valve, cannot lead to failure of the LOTO function.

The safety device becomes more compact in terms of dimensions and more secure against release of the secured state if the first sleeve can be received at least in portions in the second sleeve.

According to another development, the first coupling portion is cylindrical and comprises a groove oriented in a circumferential direction. This is a cost-effective design in which the coupling portion mechanically takes on the role of a pressure medium line and can be secured well by means of the groove.

The pressure medium line does not necessarily have to be connected to anything during the LOTO state, but rather can, in principle, remain free. However, it is safer to connect said line to the safety device, which is why it is advantageous if the second coupling portion comprises a receptacle in which a pressure medium line can be received. This reduces operating errors.

According to another development, a free end of the second sleeve and a free end of the second coupling portion can be made to coincide. In the LOTO state, when the safety device has been installed, the end of the pressure medium line and any operating elements, for example a clamping device, provided on the line and/or safety device are inaccessible on account of this design. The safety of the LOTO state is thus increased.

The sleeves can be locked individually. It is advantageous to immobilize both sleeves by means of a common securing element. An advantageously safe and cost-effective solution provides for making through-holes in at least the main body and one of the sleeves coincide and inserting a securing element through said through-holes, for example a U-lock.

The safety of the LOTO state of the safety device is further increased in that the first sleeve comprises a stop that blocks a movement of the first sleeve when a U-lock is received in the through-holes. The safety device is prevented from becoming released from the pressure medium connection even more reliably.

The advantages of the above-mentioned safety device and the embodiments thereof are particularly evident in the case of an arrangement or system with a drive and a control head, where the safety device is arranged between a pressure medium line and a pressure medium connection. Control heads couple devices of a process plant, for example valves, to a plant control system. The danger of commands of the plant control system being implemented by the control head at an inappropriate time is prevented by the safety device without any changes having to be made at the plant control system.

These advantages are particularly evident in the case of an arrangement with a drive and a control head where the pressure medium line is arranged on the control head.

A method is provided for securing an arrangement or system comprising a drive operated with a pressure medium and comprising a safety device according to the embodiments already described, in which the first coupling portion is connected to a pressure medium connection and the second coupling portion is connected to a pressure medium line, the first coupling portion is covered by the first sleeve and the second coupling portion is covered by the second sleeve and, finally, the first and second sleeves are immobilized using a securing element. In this way, pneumatic air is reliably prevented from flowing from the pressure medium line into the pressure medium connection and release is prevented without the safety element being removed because both coupling portions are covered and thus can no longer be operated.

BRIEF DESCRIPTION OF THE DRAWINGS

The invention will be described and the advantages thereof explained in more detail based on examples shown in the drawings.

DETAILED DESCRIPTION

Figure 1:
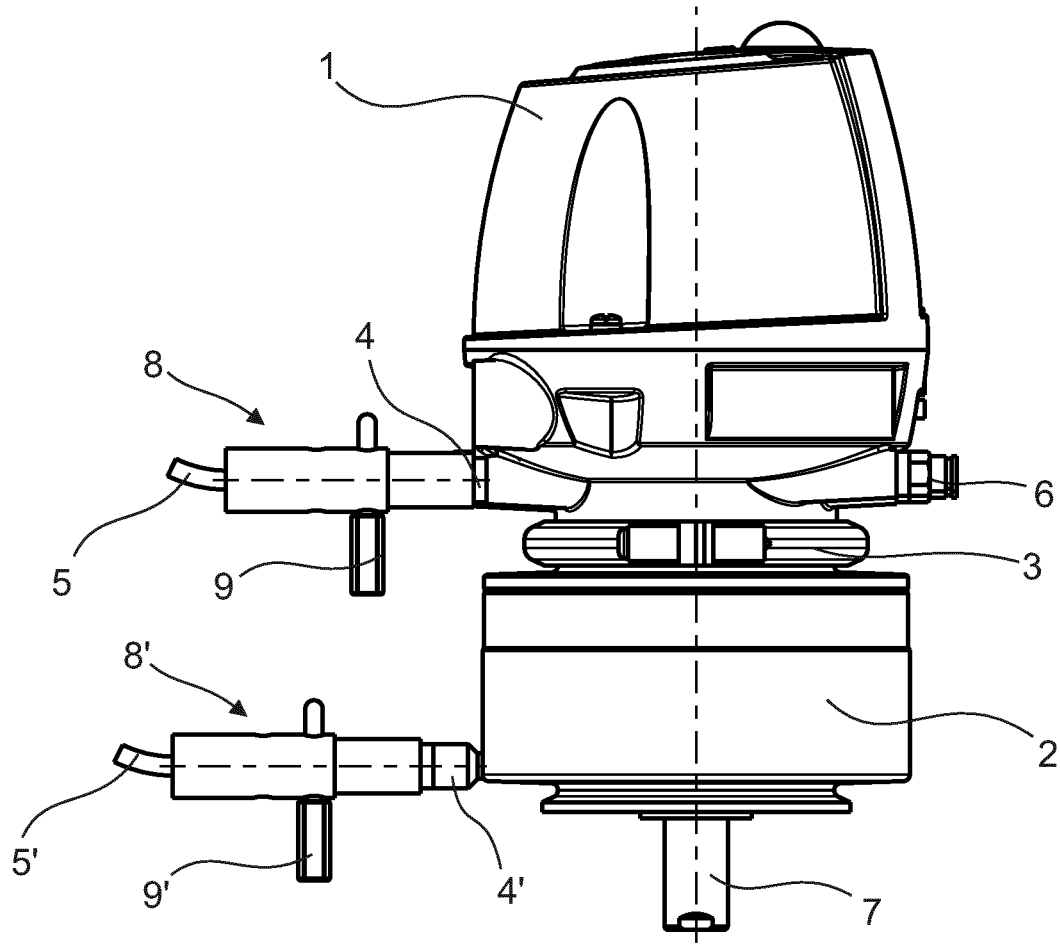
FIG. 1 is a view of a control head having a flange-mounted drive for a valve.

FIG. 1 is an external view of a control head 1 that is flange-mounted on a pneumatic drive 2. The flange connection 3 is designed to be releasable. The control head 1 can be connected to a plant control system in order, for example, to receive position commands therefrom and to report positions thereto. A pressure medium connection 4 is provided, which can be connected to a pressure medium line 5 of a plant.

At least one pilot valve is provided in the control head 1, by means of which pilot valve the pressure medium, for example pneumatic air, is switched. This switched flow of pressure medium is used to pressurize a piston. The pressure medium can be guided via a corresponding design of the flange connection with a pressure medium channel. Alternatively, or additionally, a connection 6 may be provided to connect an additional pressure medium line to which the control head 1 and an additional piston are connected. Multiple pistons are required, for example, if additional positions are to be realized in addition to the open-close function of the valve. These positions may be required, for example, for creating a partial stroke to bring the closing element of the valve into a cleaning position. In this cleaning position, the closing element is generally only raised slightly from the seat thereof so as to form a gap that makes the seal and seat accessible to a cleaning fluid. If multiple closing elements are provided in the valve, multiple pilot valves and connections 6 may be required.

The drive 2 comprises a drive rod 7 that can be connected to a valve rod of the valve and that transmits the pressure medium-induced movement of a piston of the drive 2 to the closing element of the valve. The drive 2 may also comprise a pressure medium connection 4'.

The control head 2 is brought into the safe LOTO state, in which it no longer switches the valve, by a safety device 8 inserted between the pressure medium connection 4 and the pressure medium line 5. For this purpose, the pressure medium line 5 is first disconnected from the pressure medium connection 4. Subsequently, the pressure medium line 5 is connected to the safety device 8 and the safety device 8 is connected to the pressure medium connection 4.

The safety device 8 may be secured by means of a U-lock 9 or a similar element. This securing element prevents the safety device 8 from becoming disconnected from the pressure medium connection 4 and from the pressure medium line 5.

If an additional pressure medium connection 4' is provided on the drive, said connection can also be secured against undesired actuation by means of a safety device 8'. The safety device 8' is then arranged between an additional pressure medium line 5' and the additional pressure medium connection 4' and is likewise secured by means of a U-lock 9'.

Figure 2:
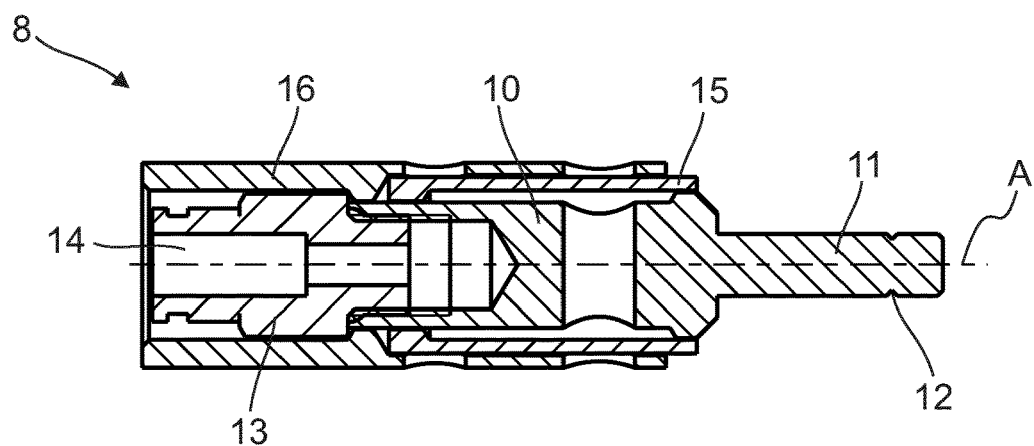
FIG. 2 is a longitudinal section through a safety device in a first position of the sleeves thereof.
Figure 3:
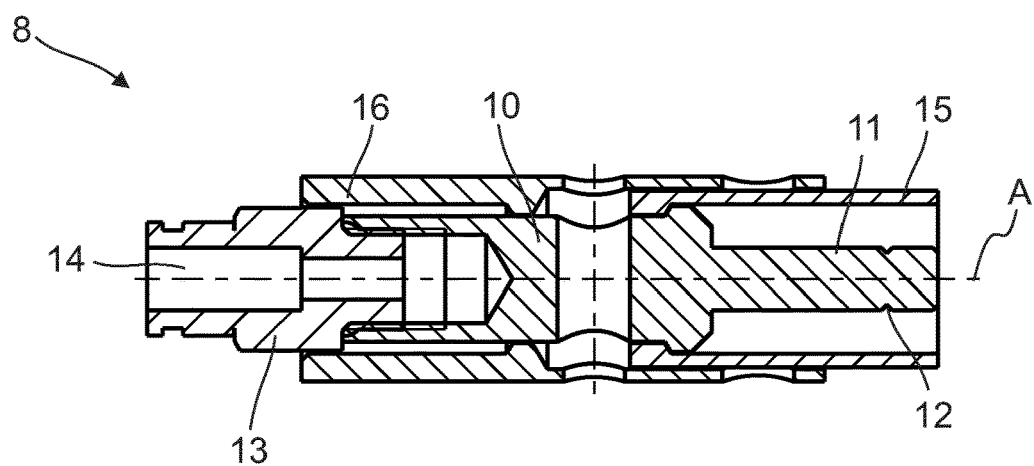
FIG. 3 is a longitudinal section through the safety device in a second position of the sleeves thereof.
Figure 4:
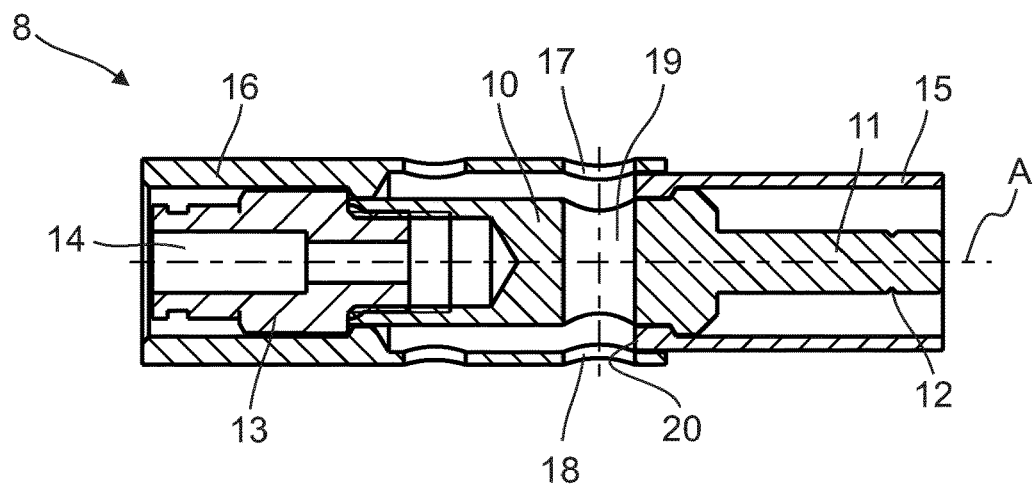
FIG. 4 is a longitudinal section through the safety device in a third position of the sleeves thereof.

The design and function of the safety device 8 are explained in more detail based on FIG. 2 to FIG. 4, which show the safety device 8 in a longitudinal section. In the figures, various phases of the installation of the safety device 8 on a control head 1 and/or drive 2 are shown.

In FIG. 2, a main body 10 extends along a longitudinal axis A.

A first coupling portion 11 is provided on a first end and is designed to cooperate with the connection 4. In the example shown, the first coupling portion is cylindrical and has an outer diameter that corresponds to that of the pressure medium line 5. Typically, the connection 4 is designed as a plug-in connection for the pressure medium line 5. Plug-in receptacles of this kind are known in Patent Publication Nos. DE 2401505 A1, DE 25 28 757 B2, and DE 197 25 999 C1, which disclose plug-in receptacles that are also used in the fields of application described at the outset in an identical or similar form. The pressure medium 5 is received and clamped in the connection 4 designed in such a manner, wherein the clamping mechanism is designed to be releasable. The first coupling portion 11 may comprise a groove 12 that cooperates with the clamping mechanism and prevents the coupling portion 11 from sliding out of the connection 4.

A second coupling portion 13 is connected to the main body 10 or is formed on an end of the main body 10 that is opposite the first coupling portion 11. The second coupling portion 13 comprises a receptacle 14 in which the pressure medium line 5 can be received. The representation in FIG. 2 to FIG. 4 shows a very simple design. However, the receptacle 14 and the second coupling portion 13 preferably comprise a clamping mechanism according to the prior art, for example of the like in Patent Publication Nos. DE 2401505 A1, DE 25 28 757 B2, and DE 197 25 999 C1, such that the pressure medium line 5 is securely held.

Often, the connection 4 and second coupling portion 13 each comprise one operating element by means of which the clamping mechanism can be released. each operating element may be, for example, a pressure element or a union nut.

A first sleeve 15 is arranged on the main body 10. The first sleeve 15 is designed to be movable along the longitudinal axis A with respect to the main body 10. The main body bears a second sleeve 16 that is also designed to be movable with respect thereto along the longitudinal axis A. The first sleeve 15 is designed to surround the first coupling portion 11. The second sleeve 16 is designed to surround the second coupling portion 13. In addition, the first sleeve 15 can be received at least in portions in the second sleeve 16.

In FIG. 2, the first sleeve 15 is positioned such that the first coupling portion 11 is exposed. The first coupling portion 11 can then be easily installed in the connection 4.

In contrast, the second sleeve 16 covers the second coupling portion 13 such that second coupling portion 13 cannot be operated.

FIG. 3 shows a position of the first sleeve 15 and the second sleeve 16 used after installation of the safety device 8 by inserting the first coupling portion 11 at the connection 4. The first sleeve 15 is then moved such that the first coupling portion 11 is covered. The free ends of the coupling portion 11 and of the first sleeve 15 are now located next to one another. As a result, the connection 4 is also received in the first sleeve 15, and any operating elements are no longer accessible.

The second sleeve 16 is pushed in the direction of the first sleeve 15 and partially covers the first sleeve 15. In particular, the second sleeve 16 exposes the second coupling portion 13. As a result, the pressure medium line 5 can be installed in the receptacle 14.

FIG. 4 shows the installed position of the safety device 8. The first sleeve 15 is still in the position according to FIG. 3, in which it covers the first coupling portion 11. In addition, according to FIG. 4, the second sleeve 16 has been moved such that it covers the second coupling portion 13. In particular, the second sleeve 16 covers any operating elements by means of which the pressure line 5 can be released from the receptacle 14. This is achieved in that free ends of the second sleeve 16 and of the second coupling portion 13 coincide.

The second sleeve 16 comprises a first through-hole 17 and a second through-hole 18 that oppose one another on a lateral surface of the second sleeve 16. In the position according to FIG. 4, the first through-hole 17 and the second through-hole 18 are aligned with a third through-hole 19 in the main body 10. A securing element can be received in the first through-hole 17, the second through-hole 18, and the third through-hole 19. This may, for example, be a crossbolt that passes through the first through-hole 17, the second through-hole 18, and the third through-hole 19 in the main body 10 and through the first sleeve 15 and the second sleeve 16 and that is additionally secured from being removed from the first through-hole 17, the second through-hole 18, and the third through-hole 19. The securing element is designed as a U-lock 9, which is advantageously cost-effective and is easy and reliable to operate. It secures the main body 10 and second sleeve 16 in position relative to one another. The first sleeve 15 comprises a stop 20 that contacts the U-lock 9 and blocks a movement of the first sleeve 15.

To install the safety device 8 on a control head or a pneumatically operated actuator, the control head or actuator is first moved into the desired switching position. For example, the compressed air is controlled such that the valve drive moves into a spring-closing "rest position" without pressure. For example, to shut off a pipeline, this may be a "normally closed" valve, which closes without compressed air and opens with compressed air. Subsequently, if required, the pressure on the pressure medium line is reduced and said line is disconnected from the control head or actuator. Then, the safety device 8 is either brought into the position according to FIG. 2 or FIG. 3. In the position of the first sleeve 15 and the second sleeve 16 according to FIG. 2, the safety device 8 is connected to the control head or actuator. Then, the first sleeve 15 is moved to cover the first coupling portion 11. Subsequently, the second sleeve 16 is moved to make the second coupling portion 13 accessible. The first sleeve 15 and the second sleeve 16 can be moved simultaneously. When the second coupling portion 13 is exposed, as shown in FIG. 3, the pressure medium line 5 is connected to the second coupling portion 13. As soon as this occurs, the second sleeve 16 is moved to cover the second coupling portion 13. Meanwhile, the first sleeve 15 remains in the covering position. This produces the position according to FIG. 4. Finally, a securing element, in this case a shackle of the U-lock 9, is inserted through the first through-hole 17, the second through-hole 18, and the third through-hole 19. When the U-lock 9 is closed, the safety device is immobilized in the state according to FIG. 4 and the control head or actuator is reliably secured against an undesired change of the switching state.

The following is a list of reference signs used in this specification and in the drawings.

1 Control head
2 Drive
3 Flange connection
4, 4' Pressure medium connection
5' Pressure medium line
6 Connection
7 Drive rod
8, 8' Safety device
9, 9' U-lock
10 Main body
11 First coupling portion
12 Groove
13 Second coupling portion
14 Receptacle
15 First sleeve
16 Second sleeve
17 First Through-hole
18 Second Through-hole
19 Third Through-hole
20 Stop
A Longitudinal axis

The invention claimed is:

1. A safety device, comprising:
a main body that extends along a longitudinal axis;
a first coupling portion and a second coupling portion; and
a first sleeve and a second sleeve, wherein:
the first sleeve and second sleeve are arranged on the main body so as to be movable along the longitudinal axis;
the first sleeve, the second sleeve, and the main body are selectively movable into a position in which at least one of the first sleeve or the second sleeve covers the associated first coupling portion and second coupling portion;
the first sleeve and the second sleeve are selectively lockable in the position using a common securing element; and
the second sleeve comprises two through-holes that oppose one another on a lateral surface of the second sleeve and that are aligned with a third through-hole in the main body in the position of the first and second sleeves.

2. The safety device according to claim 1, wherein the first sleeve is received at least in portions in the second sleeve.

3. The safety device according to claim 1, wherein the first coupling portion is cylindrical and comprises a groove oriented in a circumferential direction.

4. The safety device according to claim 1, wherein the second coupling portion comprises a receptacle in which a pressure medium line can be received.

5. The safety device according to claim 1, wherein a free end of the second sleeve and a free end of the second coupling portion can be made to coincide.

6. The safety device according to claim 1, wherein the first sleeve comprises a stop which blocks a movement of the first sleeve when a U-lock is received in the two through-holes that oppose one another and the third through-hole.

7. A system, comprising:
   a drive;
   a control head; and
   the safety device according to claim 1 arranged between a pressure medium line and a pressure medium connection.

8. The system according to claim 7, wherein the pressure medium connection is arranged on the control head.

9. A method for securing a system including a drive operated with a pressure medium using the safety device according to claim 1, comprising:
   connecting the first coupling portion to a pressure medium connection;
   connecting the second coupling portion to a pressure medium line, wherein the first coupling portion is covered by the first sleeve, and the second coupling portion is covered by the second sleeve; and
   immobilizing the first sleeve and the second sleeve using a securing element.

10. The safety device according to claim 2, wherein the first coupling portion is cylindrical and comprises a groove oriented in a circumferential direction.

11. The safety device according to claim 2, wherein the second coupling portion comprises a receptacle in which a pressure medium line can be received.

12. The safety device according to claim 2, wherein a free end of the second sleeve and a free end of the second coupling portion can be made to coincide.

13. The safety device according to claim 3, wherein the second coupling portion comprises a receptacle in which a pressure medium line can be received.

14. The safety device according to claim 3, wherein a free end of the second sleeve and a free end of the second coupling portion can be made to coincide.

15. The safety device according to claim 3, wherein the first sleeve comprises a stop which blocks a movement of the first sleeve when a U-lock is received in the two through-holes that oppose one another and the third through-hole.

16. The safety device according to claim 4, wherein a free end of the second sleeve and a free end of the second coupling portion can be made to coincide.

* * * * *